United States Patent [19]
Ding

[11] Patent Number: 6,005,626
[45] Date of Patent: Dec. 21, 1999

[54] DIGITAL VIDEO SIGNAL ENCODER AND ENCODING METHOD

[75] Inventor: Wei Ding, Fremont, Calif.

[73] Assignee: Sun Microsystems, Inc., Palo Alto, Calif.

[21] Appl. No.: 08/780,780

[22] Filed: Jan. 9, 1997

[51] Int. Cl.$^6$ .............................. H04N 7/12; H04N 11/02; H04N 11/04; H04N 5/21
[52] U.S. Cl. ............................................ 348/416; 348/608
[58] Field of Search .................................... 348/620, 416, 348/415, 607, 608, 394; H04N 7/12, 11/02, 11/04, 5/21

[56] References Cited

U.S. PATENT DOCUMENTS

| | | | |
|---|---|---|---|
| 4,275,418 | 6/1981 | Trump et al. | 358/167 |
| 4,692,801 | 9/1987 | Ninomiya et al. | 358/133 |
| 5,231,484 | 7/1993 | Gonzales et al. | 358/133 |
| 5,361,105 | 11/1994 | Iu | 348/413 |
| 5,438,374 | 8/1995 | Yan | 348/416 |
| 5,557,330 | 9/1996 | Astle | 348/394 |
| 5,610,657 | 3/1997 | Zhang | 348/415 |
| 5,671,264 | 9/1997 | Florent et al. | 378/98 |
| 5,703,966 | 12/1997 | Astle | 348/415 |

OTHER PUBLICATIONS

Özkan, Sezan, and Tekalp, "Adaptive Motion–Compensated Filtering of Noisy Image Sequences", *IEEE Transactions on Circuits and Systems for Video Technology*, vol. 3, No. 4, Aug. 1993 at 277–290.

Wong and Viscito, "Preprocessing with Motion Information from MPEG Encoder", *1996 SPIE Digital Video Compression*, vol. 2668, Jan. 1996, pp. 189–197.

Wong, Viscito, and Linzer, "Preprocessing of Video Signals for MPEG Coding by Clustering Filter," *IEEE ICIP*, vol. 2, Sep. 1995, pp. 129–132.

*Primary Examiner*—Howard Britton
*Assistant Examiner*—Nhon T. Diep
*Attorney, Agent, or Firm*—B. Noel Kivlin; Conley, Rose & Tayon, PC

[57] ABSTRACT

Motion vectors and associated errors which are determined in the course of encoding a video signal are used to determine whether respective macroblocks of two or more frames represent the same subject matter albeit displaced by motion represented by the frames. The motion vector errors are compared to a predetermined motion threshold. If a particular motion vector error is less than the motion threshold, the macroblocks corresponding to the motion vector error are determined to represent substantially identical subject matter and the corresponding motion vector represents displacement of the subject matter between the frames due to motion of the subject matter. Accordingly, differences between the macroblocks corresponding to the motion vector error are determined to be due primarily to noise and not to differences in the subject. Therefore, a relatively heavy temporal filter is applied between the macroblocks. Conversely, if a particular motion vector error is not less than the motion threshold, the macroblocks corresponding to the motion vector error are determined to represent different subject matter and only a spatial filter is applied to either macroblock. The spatial filter is applied relatively lightly to reduce noise while minimizing signal loss, e.g., blurring, resulting from the filtering. The motion threshold is set according to the noise variance of the video signal which is being encoded. The noise variance of the video signal can be measured using the video signal acquisition equipment used to acquire the video signal, e.g., a video camera, or can be estimated from the video signal itself.

24 Claims, 5 Drawing Sheets

DIGITAL VIDEO SIGNAL ENCODER AND ENCODING METHOD

FIELD OF THE INVENTION

The present invention relates to digital video signal compression and, in particular, to a particularly efficient signal filtering and compression mechanism for encoding digital video signals according to digital video standards such as the ITU standards H.261 and H.263 and the ISO standards MPEG-1, MPEG-2, and MPEG-4.

BACKGROUND OF THE INVENTION

With the advent of digital video products and services, such as Digital Satellite Service (DSS) and storage and retrieval of video streams on the Internet and, in particular, the World Wide Web, digital video signals are becoming ever present and drawing more attention in the marketplace. Because of limitations in digital signal storage capacity and in network and broadcast bandwidth limitations, compression of digital video signals has become paramount to digital video storage and transmission. As a result, many standards for compression and encoding of digital video signals have been promulgated. For example, the International Telecommunication Union (ITU) has promulgated the H.261 and H.263 standards for digital video encoding. Additionally, the International Standards Organization (ISO) has promulgated the Motion Picture Experts Group (MPEG), MPEG-1, and MPEG-2 standards for digital video encoding.

These standards specify with particularity the form of encoded digital video signals and how such signals are to be decoded for presentation to a viewer. However, significant discretion is left as to how the digital video signals are to be transformed from a native, uncompressed format to the specified encoded format. As a result, many different digital video signal encoders currently exist and many approaches are used to encode digital video signals with varying degrees of compression achieved.

The primary objective of any digital video signal encoder is to achieve a high degree of compression without a significant loss of video signal. Video signal compression is generally achieved by representing identical or similar portions of an image as infrequently as possible to avoid redundancy. As a result, an image which has only very coarse detail and very few distinct colors can be compressed to a much smaller representation in comparison to a compressed representation of an image with significant amounts of very fine detail and many distinct colors. Unfortunately, video cameras and other video signal acquisition equipment introduce noise into the video signal and, from the perspective of video signal processing, the noise is generally indistinguishable from fine detail in the subject of the video signal. For example, ordinary noise in a monochromatic image may be indistinguishable from the fine detail and texture of a terrycloth towel photographed up close.

In addition, noise can have a more severely adverse effect on the degree to which a motion video signal can be compressed than the effect on such compression of fine detail in the subject matter of the motion video signal. In particular, a video image with fine detail frequently includes picture elements, i.e., pixels, which differ only incrementally from one another and which are identical to many other pixels representing other portions of the fine detail. For example, a video image of the fine detail in a knitted sweater typically includes a number of pixels which represent different shades of the same color, or of a few colors, and each shade is represented by a substantial number of pixels. During compression, e.g., using a discrete cosine transformation (DCT), such an image can be compressed quite significantly since different shades of the same color or a few colors are typically grouped into a narrow spectrum and the remainder of the spectrum is discarded. Noise has a particularly adverse effect on such compression since the noise is frequently unrelated to the subject matter of the video image and frequently results in pixel values being transformed outside the narrow spectrum such that greater portions of the transformed pixel data spectrum must be included in the compressed video signal.

To achieve both enhanced image quality and greater compression, video signal encoders frequently filter a video signal prior to encoding the video signal. However, the use of a particularly strong filter achieves greater compression at the expense of greater signal loss, and a particularly light filter preserves more of the original signal at the expense of a smaller degree of compression. One such system is described in U.S. Pat. No. 5,231,484 to Gonzales et al. for "Motion Video Compression System with Adaptive Bit Allocation and Quantization" dated Jul. 27, 1993 (the '484 patent). The '484 patent describes a system which uses an estimation of error in a macroblock of an MPEG encoded frame to determine how strong a filter to apply to the macroblock. However, the estimation of error in the '484 patent does not adequately distinguish noise in the image of the frame from detail in the image. In addition, the filtering performed by the system described in the '484 patent is a smoothing, spatial filter which suffers from unacceptable levels of signal loss in particularly noisy images.

What is needed is a digital video signal encoder which can better distinguish between noise and fine detail in the video signal and filter the video signal in such a way that maximizes elimination of noise to thereby simultaneously improve the quality of the video signal and maximize compression of the video signal.

SUMMARY OF THE INVENTION

In accordance with the present invention, motion vectors and motion vector errors which are determined in the course of encoding a video signal are used to determine whether respective macroblocks of two or more frames represent the same subject matter albeit displaced by motion represented by the frames. In particular, the motion vector errors are compared to a predetermined motion threshold. If a particular motion vector error is less than the motion threshold, the macroblocks corresponding to the motion vector error are determined to represent substantially identical subject matter and the corresponding motion vector represents displacement of the subject matter between the frames due to motion of the subject matter. Accordingly, differences between the macroblocks corresponding to the motion vector error are determined to be due primarily to noise and not to differences in the subject. Therefore, a relatively heavy temporal filter is applied between the macroblocks. The heavy filter does not result in video signal loss since macroblocks representing substantially identical subject matter are combined in a weighted average temporal filter. Meanwhile, the heavy temporal filter results in significant reduction of noise in the video signal and therefore simultaneously enhances the quality of the video signal and improves substantially the degree of compression of the video signal achieved by encoding the video signal.

Conversely, if a particular motion vector error is not less than the motion threshold, the macroblocks corresponding to the motion vector error are determined to represent different subject matter and only a spatial filter is applied to either macroblock. The spatial filter is applied relatively lightly to reduce noise while minimizing signal loss, e.g., blurring, resulting from the filtering. Thus, in macroblocks of a video signal which can be effectively filtered using a temporal filter, heavy temporal filtering greatly reduces noise and improves compression, and light spatial filtering avoids excessive loss of signal when macroblocks cannot be effectively filtered using a temporal filter. In addition, motion vectors and motion vector errors which are determined in the course of video signal encoding are used to reduce redundant calculations to estimate motion and errors associated with such estimation.

Further in accordance with the present invention, the motion threshold is set according to the noise variance of the video signal which is being encoded. The noise variance of the video signal can be measured using the video signal acquisition equipment used to acquire the video signal, e.g., a video camera, or can be estimated from the video signal itself. To measure the noise variance from the video signal acquisition equipment, two separate images of substantially identical subject matter are acquired using the equipment. Noise variance is calculated from measured differences between the two images. To estimate noise variance from the video signal itself, motion vector errors for a particular frame are examined. A number of macroblocks which correspond to the smallest motion vector errors are selected. The smallest motion vector errors are selected because the differences between such macroblocks is more likely due to noise and not to differences in the subject matter of the macroblocks and the corresponding macroblocks identified by the respective motion vectors. Differences between the selected macroblocks and corresponding macroblocks identified by respective motion vectors are measured and the measured differences are used to calculate therefrom an estimated noise variance. A new estimated noise variance is calculated in an analogous manner from each of a number of subsequent frames. For each frame encoded, the motion threshold is determined according to the smallest estimated noise variance calculated prior to encoding of the frame. The smallest estimated noise variance is used because larger estimated noise variances are likely inflated because of minor variations in subject matter represented in corresponding motion-vectored macroblocks.

Further in accordance with the present invention, the encoded frame is transformed and the transformation coefficients are quantized in a manner which prevents unnecessary loss of video signal. Coefficients of macroblocks which are temporally filtered are quantized using a quantization parameter which is less than the quantization parameter used to quantize coefficients of macroblocks which are spatially filtered. Since better filtering and compression are achieved for macroblocks which are temporally filtered, the transformation coefficients of such macroblocks can be quantized using a smaller quantization parameter to preserve signal. The amount by which the temporal quantization parameter is reduced from the spatial quantization parameter depends on the particular value of the spatial quantization parameter. Larger spatial quantization parameters are reduced by a larger amount.

DETAILED DESCRIPTION

In accordance with the present invention, motion vectors and motion vector errors which are determined in the course of encoding a video signal are used to determine whether respective macroblocks of two or more frames represent the same subject matter albeit displaced by motion represented by the frames.

Familiarity with MPEG encoded digital video signals facilitates appreciation of the present invention in the context of the following description of illustrative embodiments. MPEG encoded digital video signals are described more completely in the '484 patent and that description is incorporated herein in its entirety by reference. Briefly, a digital motion video image, which is sometimes called a video stream, is organized hierarchically into groups of pictures which includes one or more frames, each of which represents a single image of a sequence of images of the video stream. Each frame includes a number of macroblocks which define respective portions of the video image of the frame. An I-frame is encoded independently of all other frames and therefore completely represents an image of the sequence of images of the video stream. P-frames and B-frames are motion-compensated frames and are therefore encoded in a manner which is dependent upon other frames. A P-frame is a predictively motion-compensated frame and depends only upon one I-frame or, alternatively, another P-frame which precedes the P-frame in the sequence of frames of the video image. A B-frame is a bidirectionally motion-compensated frame and depends upon one or more frames which precede or succeed the B-frame in the sequence of frames of the video image.

All frames are compressed by reducing redundancy of image data within a single frame. Motion-compensated frames are further compressed by reducing redundancy of image data within a sequence of frames. Since a motion video signal includes a sequence of images which differ from one another only incrementally, significant compression can be realized by encoding a number of frames as motion-compensated frames, i.e., as P-frames or B-frames. However, noise in sequential images of a video signal can be misinterpreted as additional differences between the images and can therefore reduce the efficiency with which P-frames and B-frames can represent the sequential images.

Figures 1, 1B:
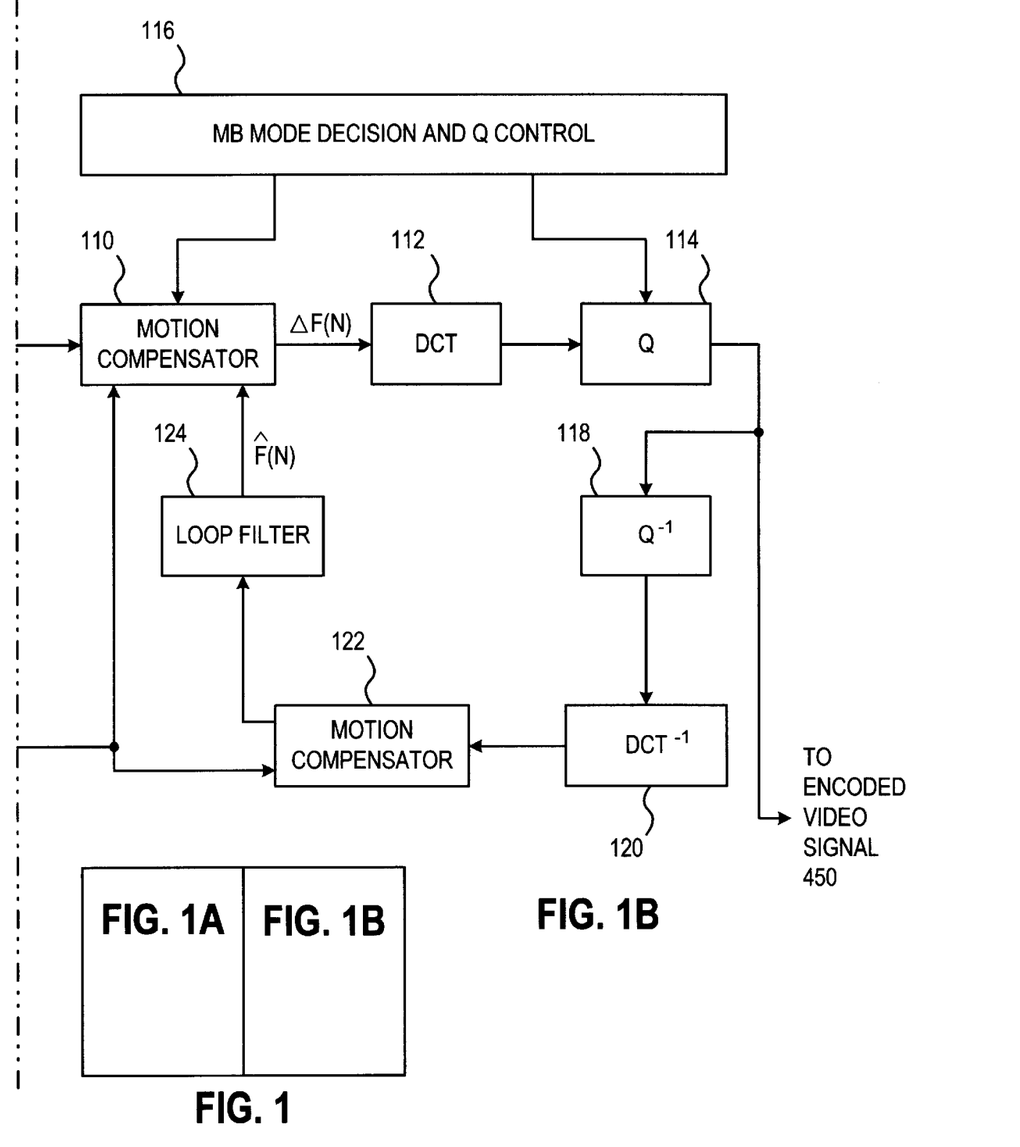
FIG. 1 is a block diagram of a video signal compressor according to the present invention.
Figure 1A:
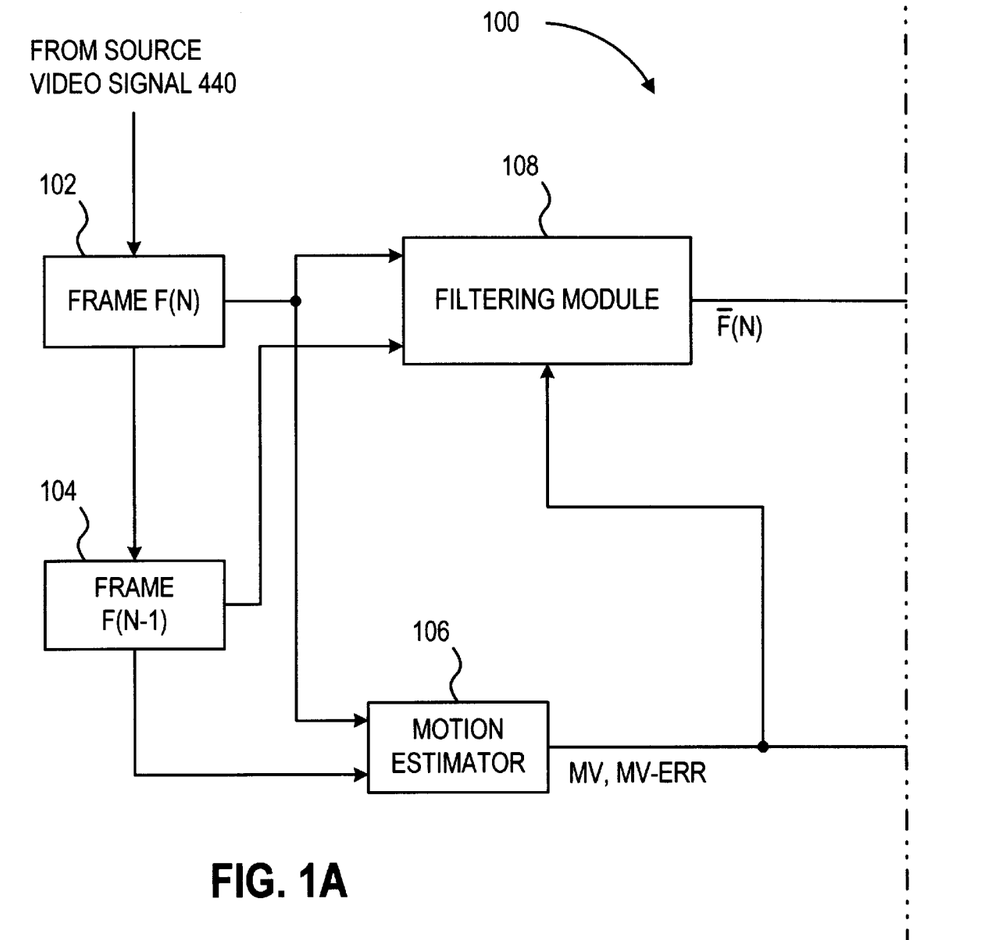

A video signal compressor 100 in accordance with the present invention is shown in FIG. 1. Video signal compressor 100 receives a frame of a video signal from a video source (not shown) which can include, for example, a video camera, a video cassette player, a video laser disk player, or similar video source. Video signal compressor 100 stores the frame in buffer 102 after moving any frame previously stored in buffer 102 into buffer 104. Thus, video signal compressor 100 stores two successive frames in buffers 102 and 104. The frame stored in buffer 102 is sometimes referred to herein as the current frame, and the frame stored in buffer 104 is sometimes referred to herein as the previous frame. Motion estimator 106 of video signal compressor 100 retrieves each frame from buffers 102 and 104 and derives motion vectors which represent motion between the current and previous frames. For each of one or more macroblocks of the current frame, motion estimator 106 derives a motion vector which specifies a portion of the previous frame which the macroblock corresponds and an associated motion vector error signal. A motion vector specifies a motion-compensated macroblock in terms of a vector to an equal-sized portion of another frame. A macroblock specified by a motion vector of a particular macroblock is sometimes referred to herein as a macroblock which is temporally displaced from the particular macroblock. A motion vector error signal an amount of variation between the macroblock and a temporally displaced macroblock of the macroblock. Motion estimator 106 and the derivation of motion vectors and motion vector error signals by motion estimator 106 are conventional and are not further described herein.

Filtering module 108 of video signal compressor 100 filters individual macroblocks of the current frame prior to compressing and encoding the macroblocks for inclusion in a video stream. In accordance with the present invention, filtering module 108 applies either a temporal filter when a high correlation exists between the current and previous frames in buffers 102 and 104, respectively, or a spatial filter when a low correlation exists between the current and previous frames. Filtering module 108 of video signal compressor 100 retrieves the current and previous frames from buffers 102 and 104, respectively, and receives from motion estimator 106 the derived motion vectors and associated motion vector error signals.

Figure 2:
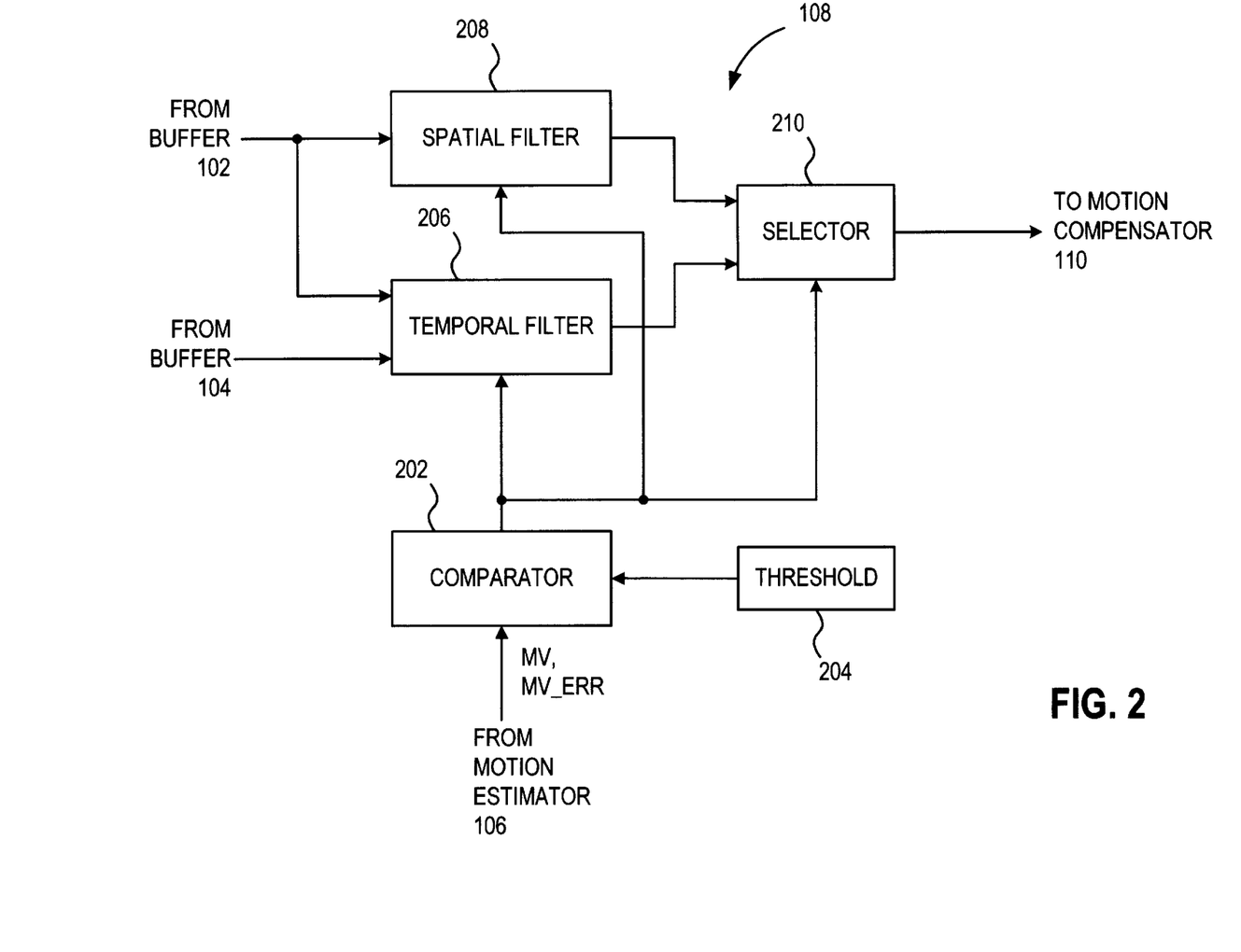
FIG. 2 is a block diagram of the filtering module of FIG. 1.
Figure 3:
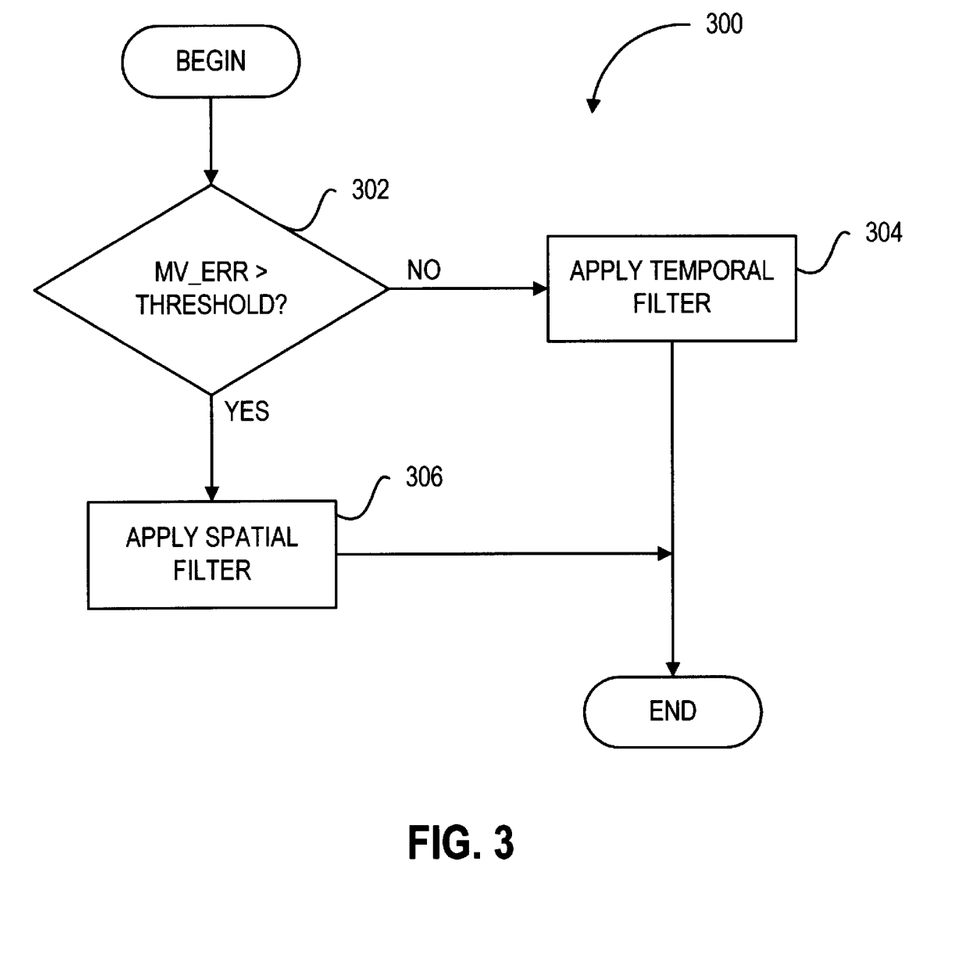
FIG. 3 is a logic flow diagram illustrating the processing of the filtering module of FIG. 2.

Filtering module 108 is shown in greater detail in FIG. 2. Processing of each macroblock of the current frame is illustrated by logic flow diagram 300 (FIG. 3) in which processing begins with test step 302. In test step 302, a comparator 202 (FIG. 2) of filtering module 108 receives the motion vector and motion vector error signal from motion estimator 106. Comparator 202 compares the motion vector error signal to a predetermined threshold value which is represented in threshold register 204. The predetermined threshold value is sometimes referred to herein as the motion threshold. If the motion vector error signal represents an error which is less than the motion threshold, processing transfers from test step 302 (FIG. 3) to step 304.

In step 304, comparator 202 (FIG. 2) activates a temporal filter 206 of filtering module 108 and causes a selector 210 to select the output of temporal filter 206 as the output of filtering module 108. In one embodiment, selector 210 is a multiplexer. Temporal filter 206 receives both a macroblock of the current frame from buffer 102 and a temporally displaced macroblock of the previous frame from buffer 104 and applies a temporal filter between the two macroblocks to produce a filtered macroblock of the current frame. Since the motion vector error signal represents a relatively low error, i.e., is less than the motion threshold, differences between the macroblock of the current frame and the temporally displaced macroblock of the previous frame are determined to be due primarily to noise. Accordingly, a particularly heavy filter is used in temporal filter 206. In one embodiment, temporal filter 206 produces a macroblock whose pixels are weighted averages of respective pixels of the macroblock of the current frame and the temporally displaced macroblock of the previous frame. The pixels of the temporally displaced macroblock, sometimes referred to as previous frame pixels, and pixels of the macroblock of the current frame, sometimes referred to as current frame pixels, are equally weighted in one embodiment. Alternatively, the previous frame pixels and current frame pixels are weighted with one of the following ratios: (i) one to three; (ii) three to five; or (iii) seven to nine.

If, in test step 302 (FIG. 3), comparator 202 (FIG. 2) determines that the motion vector error signal represents an error which is not less that the motion threshold, processing transfers from test step 302 (FIG. 3) to step 306. In step 306, comparator 202 (FIG. 2) activates a spatial filter 208 of filtering module 108 and causes selector 210 to select the output of spatial filter 208 as the output of filtering module 108. Spatial filter 208 receives only macroblocks of the current frame from buffer 102 and applies a spatial filter to the macroblocks to reduce noise in the image portion represented by the macroblocks. Since the motion vector error signal represents a relative high error, i.e., greater than the motion threshold, differences between the macroblock of the current frame and the temporally displaced macroblock of the previous frame are determined to be due primarily to differences in the image subject matter represented in each of the macroblocks and not to noise. Accordingly, a spatial filter in used only on the macroblock of the current frame. Since spatial filters typically erode the video signal in the course of reducing noise, a relatively light filter is used. For example, a spatial filter whose kernel is (1/8, 6/8, 1/8) can be applied horizontally, vertically, or in both directions. Alternatively, a filter whose kernel is (1/16, 14/16, 1/16) can be applied horizontally, vertically, or in both directions.

After either step 304 or 306 (FIG. 3), processing accordingly to logic flow diagram 300 terminates. Thus, when differences between a macroblock and an associated temporally displaced macroblock is small, the macroblocks are assumed to represent nearly identical images and those differences are assumed to be due to noise in the images represented by the macroblocks. Accordingly, heavy filtering is used between both macroblocks to eliminate as much noise as possible. Using two macroblocks whose signals are substantially identical but whose noise is generally random with respect to the signal and is therefore quite different between the macroblocks results in significant reduction of noise with very little loss of signal. As a result, significantly better compression of the video signal is realized while simultaneously achieving superior signal quality of the video image. Conversely, when the differences between two temporally displaced macroblocks is large, the macroblocks are assumed to represent different images with different subject matter and temporal filtering is presumed to be inappropriate. As a result, only spatial filtering is used and such filtering is light to avoid unnecessary loss of data.

The motion threshold stored in threshold register 204 (FIG. 2) is selected in a manner such that noise in two separate macroblocks representing nearly identical subject matter will, with reasonable certainty, have a motion vector error signal corresponding to the two macroblocks which is less than the motion threshold while two macroblocks representing similar yet somewhat different subject matter will, with reasonable certainty, have a motion vector error signal corresponding to the two macroblocks which is greater than the motion threshold. Determination of the motion threshold is described more completely below.

The filtered frame produced by either temporal filter 206 or spatial filter 208 of filtering module 108 is received by motion compensator 110 (FIG. 1). Motion compensator 110 is conventional and is described briefly for completeness. Motion compensator 110 receives from motion estimator 106 the motion vectors and motion vector error signals corresponding to the current frame stored in buffer 102 and produces a current motion-compensated frame from the motion vectors and the filtered frame received from filtering module 108.

Motion compensator 110 passes the motion-compensated frame to transform coder 112 which performs direct cosine transformation (DCT) on the motion-compensated macroblocks of the motion-compensated frame to produce a transformed frame. Transform coder 112 passes the transformed frame to quantizer 114. Quantizer 114 quantizes coefficients used in transform coder 112 and these coefficients are then used later for Huffman coding the transformed frame to complete compression of the filtered frame produced by filtering module 108. Quantization by quantizer 114 is important because a significant loss of signal for the sake of better compression happens during quantization of the transform parameters. Quantization of coefficients used in transform coder 112 is known and is described, for example, in the '484 patent and that discussion is incorporated herein by reference. Quantization involves a quantization parameter, Q, which represents a selected compromise between signal resolution in the encoded video signal and the degree of compression realized in encoding the video signal. In general, a larger quantization parameter Q results in a greater degree of compression at the expense of greater signal loss. Conversely, a smaller quantization parameter Q generally results in less signal loss at the expense of a smaller degree of compression.

Quantization parameter Q is nominally determined by MB mode and Q control 116 in which parameters are set by a user using conventional user-interface techniques to fine tune the encoding performed by video signal compressor 100. If the motion vector error signal corresponding to a particular macroblock of the current frame is greater than the motion threshold, the nominal quantization parameter Q is used to quantize the transformed macroblock in a conventional manner since spatial filtering was applied to that particular macroblock. Conversely, if the motion vector error signal corresponding to the macroblock is less than the motion threshold, a lower quantization parameter QL is used. QL can be used to quantize a temporally filtered macroblock because noise in such a macroblock has already been significantly reduced and greater degrees of compression can therefore already be realized without further significant loss of signal.

Quantization parameter QL is generally reduced from quantization parameter Q by an offset amount which is itself determined according to quantization parameter Q. In general, quantization parameter QL is reduced by larger amounts when quantization parameter Q is larger. However, quantization parameter QL is never less than one, in one embodiment. In particular, the relationship between quantization parameters Q and QL is given by the following equation.

$$QL = \max(1, Q - \Delta) \tag{1}$$

In equation (1), $\Delta$ is determined according to quantization parameter Q and, in particular, according to the following equation in one embodiment.

$$\Delta = \begin{matrix} 0, \text{if } Q < q_1 \\ 1, \text{if } q_1 \leq Q \leq q_2 \\ 2, \text{if } Q > q_2 \end{matrix} \tag{2}$$

In one embodiment, $q_1$ and $q_2$ are equal to six and ten, respectively. Thus, when quantization parameter Q is less than six, quantization parameter QL is equal to quantization parameter Q; when quantization parameter Q is at least six and no more than ten, quantization parameter QL is one less than quantization parameter Q; and when quantization parameter Q is greater than ten, quantization parameter QL is two less than quantization parameter Q.

Thus, by adjusting the quantization parameter on temporally filtered macroblocks, signal resolution is preserved. Since noise has been substantially reduced in such temporally filtered macroblocks, acceptable degrees of compression are achieved.

Video signal compressor 100 also includes dequantizer 118, transform decoder 120, motion compensator 122, and loop filter 124 which operate in a conventional manner to decode previously encoded macroblocks in video encoding protocols which support loops. Such protocols include the H.261 video compression standard promulgated by ITU.

Determination of the Motion Threshold

As described above, the motion threshold stored in threshold register 204 (FIG. 2) is selected in a manner such that noise in two separate macroblocks representing nearly identical subject matter will, with reasonable certainty, have a motion vector error signal corresponding to the two macroblocks which is less than the motion threshold while two macroblocks representing similar yet somewhat different subject matter will, with reasonable certainty, have a motion vector error signal corresponding to the two macroblocks which is greater than the motion threshold. In one embodiment, the motion threshold is calculated according to the following equation.

$$t = 256\sqrt{2var} \tag{3}$$

In equation (3), t is the motion threshold and var is the noise variance associated with the particular video signal source, such as a video camera. The noise variance can be determined by empirical measurement using the video signal source or can be estimated from the video signal itself.

Empirical measurement of noise variance of a video signal source includes comparison of two separate video images of identical subject matter. For example, a video camera can be set up to take two consecutive pictures of the same scene. Preferably, the camera doesn't move and the scene doesn't change at all between acquisition of the two pictures. For example, the camera can be placed on a tripod and activated remotely and the scene can be set up indoors or, only if there is virtually no wind, outdoors. It is understood that acquiring separate images which have perfectly identical subject matter is impracticable. However, the images should have as nearly identical subject matter as practicable. The noise variance of the video signal source can then be determined by comparison of respective pixels of the two images. Specifically, noise variance of the video signal source is calculated according to the following equation.

$$var = \frac{1}{IJ}\sum_{i=0}^{I-1}\sum_{j=0}^{J-1}(p_1(i,j) - p_2(i,j))^2 \tag{4}$$

In equation (4), I and J are the numbers of pixels in horizontal and vertical directions, respectively, and $p_1(i,j)$ and $p_2(i,j)$ are the values of the pixels in the $i^{th}$ column and $j^{th}$ row of the first and second images, respectively.

Sometimes direct measurement of motion variance is impractical. In some instances, a video signal is already stored in some storage media and encoding of the video signal to form a video stream is performed during a format conversion of the video signal. Accordingly, the video signal source is either not available or has changed significantly since the video signal was first captured, rendering any direct measurement of motion variance from the video signal source irrelevant. For example, a video signal stored on a VHS video cassette tape or on a laserdisc can be retrieved and encoded in MPEG or a similar format without access to the particular video or film cameras which captured all or part of the video signals. In such a case, motion variance is estimated from the video signal itself.

In general, two consecutive frames of the video signal are compared. For a particular frame, a proportion of the macroblocks with the smallest motion vector error signals are selected. In one embodiment, 25% of the macroblocks are selected and those macroblocks with the smallest motion vector error signals are selected. The macroblocks with the smallest motion vector error signals are chosen since such macroblocks differ the least from corresponding macroblocks of another frame. In other words, the subject matter of such macroblocks is most similar to the subject matter of corresponding temporally displaced macroblocks and any differences therebetween are more likely to be due to noise. An initial motion variance estimate is calculated from the selected macroblocks according to the following equation.

$$var_\eta = \frac{1}{256N} \sum_{n=0}^{N-1} \sum_{k=0}^{3} \sum_{i=0}^{7} \sum_{j=0}^{7} (y_n(k,i,j) - py_n(k,i,j))^2 \quad (5)$$

In equation (3), var₀ is the initial estimate of motion variance derived from the video signal itself N is the number of macroblocks selected in the manner described above. The luminance of a particular pixel of a selected macroblock is represented by $y_n(k,ij)$, and the luminance of a corresponding pixel of a corresponding temporally displaced macroblock in the immediately preceding frame is represented by $py_n(k,ij)$.

Thus, initial estimate $var_0$ of motion variance is derived from selected macroblocks of two consecutive frames of the video signal. The motion threshold is calculated from the estimated motion variance and is used in the manner described more completely above to determine whether to apply temporal filter 206 (FIG. 2) or spatial filter 208. A new estimate of motion variance is derived from each subsequent frame of the video signal according to equation (3). If the new estimate is less than the previously used estimated motion variance, a new motion threshold is calculated from the new estimated motion variance and is stored in threshold register 204, thereby superseding the previously stored motion threshold.

Inclusion of Video Signal Compressor in a Computer System

In one embodiment, video signal compressor 100 (FIG. 1) is implemented in a computer system. In particular, computer system 400 (FIG. 4) includes a processor 402 and memory 404 which is coupled to processor 402 through a bus 406. Processor 402 fetches from memory 404 computer instructions and executes the fetched computer instructions. In addition, processor 402 can fetch computer instructions through a computer network 470 through network access circuitry 460 such as a modem or ethernet network access circuitry. Processor 402 also reads data from and writes data to memory 404 and sends data and control signals through bus 406 to one or more computer display devices 420 and receives data and control signals through bus 406 from one or more computer user input devices 430 in accordance with fetched and executed computer instructions.

Figure 4:
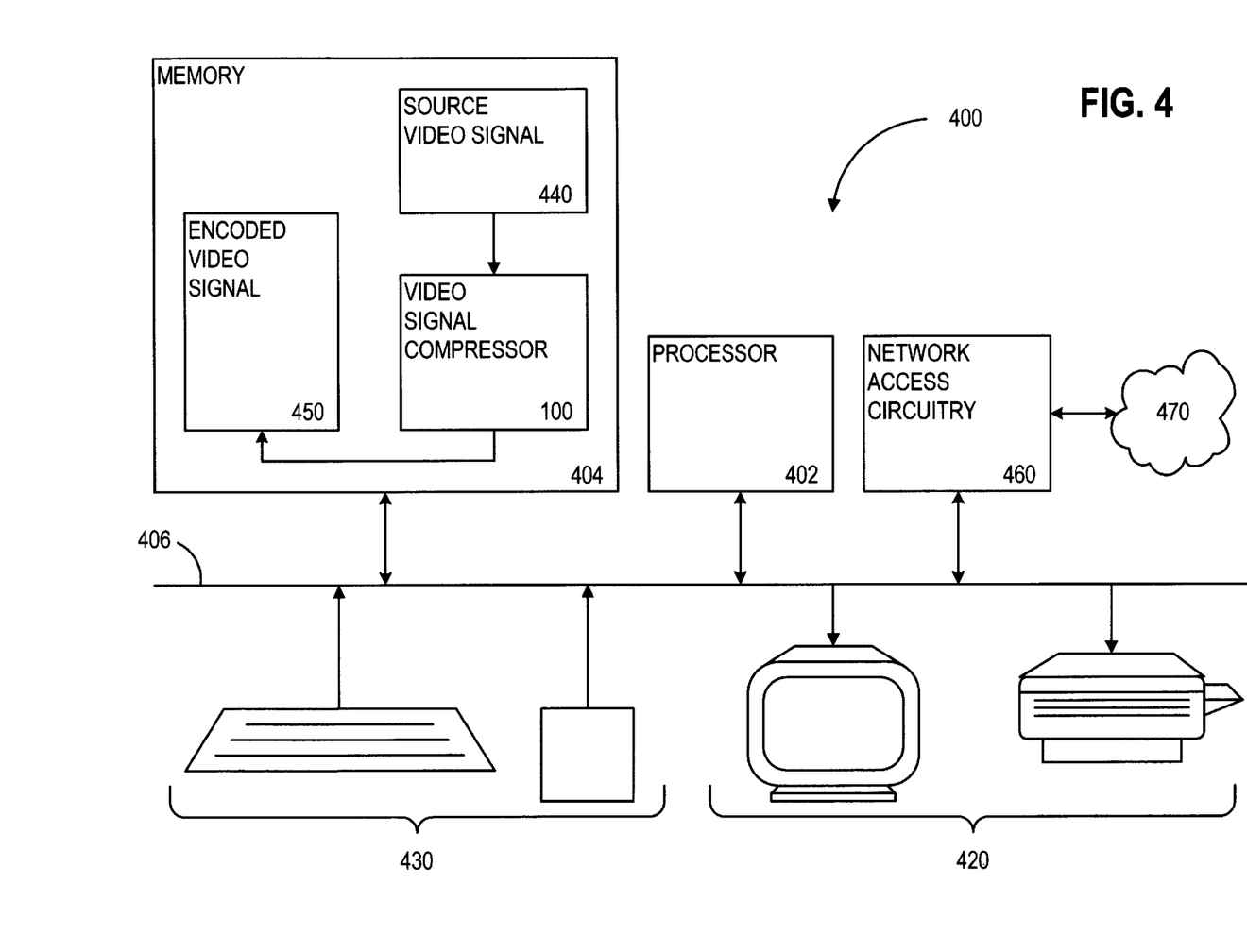
FIG. 4 is a block diagram of a computer system which includes the video signal processor of FIG. 1.

Memory 404 can include any type of computer memory and can include, without limitation, randomly accessible memory (RAM), read-only memory (ROM), and storage devices which include storage media such as magnetic and/or optical disks. Memory 404 includes video signal compressor 100 which is all or part of a computer process which in turn executes within processor 402 from memory 404. A computer process is generally a collection of computer instructions and data which collectively define a task performed by computer system 400.

Each of computer display devices 420 can be any type of computer display device including without limitation a printer, a cathode ray tube (CRT), a light-emitting diode (LED) display, or a liquid crystal display (LCD). Each of computer display devices 420 receives from processor 402 control signals and data and, in response to such control signals, displays the received data. Computer display devices 420, and the control thereof by processor 402, are conventional.

Each of user input devices 430 can be any type of user input device including, without limitation, a keyboard, a numeric keypad, or a pointing device such as an electronic mouse, trackball, lightpen, touch-sensitive pad, digitizing tablet, thumb wheels, or joystick. Each of user input devices generates signals in response to physical manipulation by a user and transmits those signals through bus 406 to processor 402.

As described above, video signal compressor 100 executes within processor 402 from memory 404. Specifically, processor 402 fetches computer instructions from video signal compressor 100 and executes those computer instructions. Processor 402, in executing video signal compressor 100, reads frames from source video signal 440, processes and encodes those frames in the manner described above, and stored the encoded frames in encoded video signal 450.

The above description is illustrative only and is not limiting. The present invention is limited only by the claims which follow.

What is claimed is:

1. A method for compressing at least a first portion of a video image of a motion video signal, the method comprising:

selecting a second portion of a different video image of the motion video signal wherein the second portion is temporally displaced from the first-mentioned portion;

producing an error signal which represents differences between the first portion and the second portion;

comparing the error signal to a predetermined threshold;

applying a temporal filter to the first and second portions to produce a filtered portion if the error signal is less than the predetermined threshold; and determining the predetermined threshold in accordance with a noise variance of the motion video signal;

wherein the step of determining the predetermined threshold comprises:

acquiring at least first and second video images having substantially identical subject matter; and comparing the first and second video image to measure the noise variance in the first and second video images.

2. A method for compressing at least a first portion of a video image of a motion video signal, the method comprising:

selecting a second portion of a different video image of the motion video signal wherein the second portion is temporally displaced from the first-mentioned portion;

producing an error signal which represents differences between the first portion and the second portion;

comparing the error signal to a predetermined threshold;

applying a temporal filter to the first and second portions to produce a filtered portion if the error signal is less than the predetermined threshold; and determining the predetermined threshold in accordance with a noise variance of the motion video signal;

wherein the step of determining the predetermined threshold comprises:

selecting one or more selected portions of the video image;

comparing the selected portions with one or more corresponding portions of the different video image to measure differences between the selected portions and the corresponding portions; and estimating the noise variance from the measured differences.

3. The method of claim 2 further comprising:

calculating a subsequent noise variance for a subsequent video image; and determining the predetermined threshold in accordance with the lesser of the first-mentioned noise variance and the subsequent noise variance.

4. A method for compressing at least a first portion of a video image of a motion video signal, the method comprising:

selecting a second portion of a different video image of the motion video signal wherein the second portion is temporally displaced from the first-mentioned portion;

producing an error signal which represents differences between the first portion and the second portion;

comparing the error signal to a predetermined threshold;

applying a temporal filter to the first and second portions to produce a filtered portion if the error signal is less than the predetermined threshold; and transforming the filtered portion using transformation coefficients;

quantizing the transformation coefficients using a quantization parameter; and adjusting the quantization parameter for the filtered portion if the error signal is less than the predetermined threshold.

5. The method of claim 4 wherein the step of adjusting comprises:

reducing the quantization parameter by a predetermined margin.

6. The method of claim 5 further comprising:

selecting the predetermined margin from a number of predetermined margins according to the quantization parameter.

7. A video signal compressor for compressing at least a first portion of a video image of a motion video signal, the video signal compressor comprising:

a motion estimator which is configured to select a second portion of a different video image of the motion video signal wherein the second portion is temporally displaced from the first-mentioned portion and which is further configured to produce an error signal which represents differences between the first portion and the second portion;

a comparator which is operatively coupled to the motion estimator and which is configured to compare the error signal to a predetermined threshold;

a temporal filter module which is operatively coupled to the comparator and which is configured to apply a temporal filter to the first and second portions to produce a filtered portion if the error signal is less than the predetermined threshold; and a threshold generator which is operatively coupled to the comparator and which is configured to determine the predetermined threshold in accordance with a noise variance of the motion video signal;

wherein the threshold generator comprises:

a video image receiving module which is configured to acquire at least first and second video images having substantially identical subject matter; and a video image comparing module which is operatively coupled to the video image receiving module and which is configured to compare the first and second video image to measure the noise variance in the first and second video images.

8. A video signal compressor for compressing at least a first portion of a video image of a motion video signal, the video signal compressor comprising:

a motion estimator which is configured to select a second portion of a different video image of the motion video signal wherein the second portion is temporally displaced from the first-mentioned portion and which is further configured to produce an error signal which represents differences between the first portion and the second portion;

a comparator which is operatively coupled to the motion estimator and which is configured to compare the error signal to a predetermined threshold;

a temporal filter module which is operatively coupled to the comparator and which is configured to apply a temporal filter to the first and second portions to produce a filtered portion if the error signal is less than the predetermined threshold; and a threshold generator which is operatively coupled to the comparator and which is configured to determine the predetermined threshold in accordance with a noise variance of the motion video signal;

wherein the threshold generator comprises:

a frame selecting module which is configured to select one or more selected portions of the video image;

a frame comparing module which is operatively coupled to the frame selecting module and which is configured to compare the selected portions with one or more corresponding portions of the different video image to measure differences between the selected portions and the corresponding portions; and a noise variance estimating module which is operatively coupled to the frame comparing module and which is configured to estimate the noise variance from the measured differences.

9. The video signal compressor of claim 8 wherein the threshold generator comprises:

a threshold comparing module which is operatively coupled to the motion variance estimating module and which is configured to determine the predetermined threshold in accordance with the lesser of the first-mentioned noise variance and a subsequent noise variance calculated for a subsequent video image.

10. A video signal compressor for compressing at least a first portion of a video image of a motion video signal, the video signal compressor comprising:

a motion estimator which is configured to select a second portion of a different video image of the motion video signal wherein the second portion is temporally displaced from the first-mentioned portion and which is further configured to produce an error signal which represents differences between the first portion and the second portion;

a comparator which is operatively coupled to the motion estimator and which is configured to compare the error signal to a predetermined threshold;

a temporal filter module which is operatively coupled to the comparator and which is configured to apply a temporal filter to the first and second portions to produce a filtered portion if the error signal is less than the predetermined threshold;

a transforming module which is operatively coupled to the temporal filter module and which is configured to transform the filtered portion using transformation coefficients;

a quantizing module which is operatively coupled to the transforming module and which is configured to quantize the transformation coefficients using a quantization parameter; and a quantization parameter adjustment module which is operatively coupled to the quantizing module and which is configured to adjust the quantization parameter for the filtered portion if the error signal is less than the predetermined threshold.

11. The video signal compressor of claim 10 wherein the quantization parameter adjustment module is further configured to reduce the quantization parameter by a predetermined margin.

12. The video signal compressor of claim 11 wherein the quantization parameter adjustment module is further configured to select the predetermined margin from a number of predetermined margins according to the quantization parameter.

13. A computer program product which includes a computer usable medium having computable readable code embodied therein for compressing at least a first portion of a video image of a motion video signal, the computer readable code comprising:

a motion estimator which is configured to select a second portion of a different video image of the motion video signal wherein the second portion is temporally displaced from the first-mentioned portion and which is further configured to produce an error signal which represents differences between the first portion and the second portion;

a comparator which is operatively coupled to the motion estimator and which is configured to compare the error signal to a predetermined threshold;

a temporal filter module which is operatively coupled to the comparator and which is configured to apply a temporal filter to the first and second portions to produce a filtered portion if the error signal is less than the predetermined threshold; and a threshold generator which is operatively coupled to the comparator and which is configured to determine the predetermined threshold in accordance with a noise variance of the motion video signal;

wherein the threshold generator comprises:
   a video image receiving module which is configured to acquire at least first and second video images having substantially identical subject matter; and
   a video image comparing module which is operatively coupled to the video image receiving module and which is configured to compare the first and second video image to measure the noise variance in the first and second video images.

14. A computer program product which includes a computer usable medium having computable readable code embodied therein for compressing at least a first portion of a video image of a motion video signal, the computer readable code comprising:

a motion estimator which is configured to select a second portion of a different video image of the motion video signal wherein the second portion is temporally displaced from the first-mentioned portion and which is further configured to produce an error signal which represents differences between the first portion and the second portion;

a comparator which is operatively coupled to the motion estimator and which is configured to compare the error signal to a predetermined threshold;

a temporal filter module which is operatively coupled to the comparator and which is configured to apply a temporal filter to the first and second portions to produce a filtered portion if the error signal is less than the predetermined threshold; and a threshold generator which is operatively coupled to the comparator and which is configured to determine the predetermined threshold in accordance with a noise variance of the motion video signal;

wherein the threshold generator comprises:
   a selecting module which is configured to select one or more selected portions of the video image;
   a comparing module which is operatively coupled to the selecting module and which is configured to compare the selected portions with one or more corresponding portions of the different video image to measure differences between the selected portions and the corresponding portions; and
   a noise variance estimating module which is operatively coupled to the comparing module and which is configured to estimate the noise variance from the measured differences.

15. The computer program product of claim 14 wherein the threshold generator comprises:

a threshold comparing module which is operatively coupled to the motion variance estimating module and which is configured to determine the predetermined threshold in accordance with the lesser of the first-mentioned noise variance and a subsequent noise variance calculated for a subsequent video image.

16. A computer program product which includes a computer usable medium having computable readable code embodied therein for compressing at least a first portion of a video image of a motion video signal, the computer readable code comprising:

a motion estimator which is configured to select a second portion of a different video image of the motion video signal wherein the second portion is temporally displaced from the first-mentioned portion and which is further configured to produce an error signal which represents differences between the first portion and the second portion;

a comparator which is operatively coupled to the motion estimator and which is configured to compare the error signal to a predetermined threshold;

a temporal filter module which is operatively coupled to the comparator and which is configured to apply a temporal filter to the first and second portions to produce a filtered portion if the error signal is less than the predetermined threshold;

a transforming module which is operatively coupled to the temporal filter module and which is configured to transform the filtered portion using transformation coefficients;

a quantizing module which is operatively coupled to the transforming module and which is configured to quantize the transformation coefficients using a quantization parameter; and a quantization parameter adjustment module which is operatively coupled to the quantizing module and which is configured to adjust the quantization parameter for the filtered portion if the error signal is less than the predetermined threshold.

17. The computer program product of claim 16 wherein the quantization parameter adjustment module is further configured to reduce the quantization parameter by a predetermined margin.

18. The computer program product of claim 17 wherein the quantization parameter adjustment module is further configured to select the predetermined margin from a number of predetermined margins according to the quantization parameter.

19. A system for distributing code (i) stored on a computer-readable medium, (ii) executable by a computer, and (iii) including at least one module, each of which is configured to carry out at least one function to be executed by the computer and which collectively are configured to compress at least a first portion of a video image of a motion video signal, the system comprising:
   a motion estimator which is configured to select a second portion of a different video image of the motion video signal wherein the second portion is temporally displaced from the first-mentioned portion and which is further configured to produce an error signal which represents differences between the first portion and the second portion;
   a comparator which is operatively coupled to the motion estimator and which is configured to compare the error signal to a predetermined threshold;
   a temporal filter module which is operatively coupled to the comparator and which is configured to apply a temporal filter to the first and second portions to produce a filtered portion if the error signal is less than the predetermined threshold; and
   a threshold generator which is operatively coupled to the comparator and which is configured to determine the predetermined threshold in accordance with a noise variance of the video signal;
   wherein the threshold generator comprises:
      a video image receiving module which is configured to acquire at least first and second video images having substantially identical subject matter; and
      a video image comparing module which is operatively coupled to the video image receiving module and which is configured to compare the first and second video image to measure the noise variance in the first and second video images.

20. A system for distributing code (i) stored on a computer-readable medium, (ii) executable by a computer, and (iii) including at least one module, each of which is configured to carry out at least one function to be executed by the computer and which collectively are configured to compress at least a first portion of a video image of a motion video signal the system comprising:
   a motion estimator which is configured to select a second portion of a different video image of the motion video signal wherein the second portion is temporally displaced from the first-mentioned portion and which is further configured to produce an error signal which represents differences between the first portion and the second portion;
   a comparator which is operatively coupled to the motion estimator and which is configured to compare the error signal to a predetermined threshold;
   a temporal filter module which is operatively coupled to the comparator and which is configured to apply a temporal filter to the first and second portions to produce a filtered portion if the error signal is less than the predetermined threshold; and
   a threshold generator which is operatively coupled to the comparator and which is configured to determine the predetermined threshold in accordance with a noise variance of the video signal;
   wherein the threshold generator comprises:
      a selecting module which is configured to select one or more selected portions of the video image;
      a comparing module which is operatively coupled to the selecting module and which is configured to compare the selected portions with one or more corresponding portions of the different video image to measure differences between the selected portions and the corresponding portions; and
      a motion variance estimating module which is operatively coupled to the comparing module and which is configured to estimate the noise variance from the measured differences.

21. The system of claim 20 wherein the threshold generator comprises:
   a threshold comparing module which is operatively coupled to the motion variance estimating module and which is configured to determine the predetermined threshold in accordance with the lesser of the first-mentioned noise variance and a subsequent noise variance calculated for a subsequent video image.

22. A system for distributing code (i) stored on a computer-readable medium, (ii) executable by a computer, and (iii) including at least one module, each of which is configured to carry out at least one function to be executed by the computer and which collectively are configured to compress at least a first portion of a video image of a motion video signal, the system comprising:
   a motion estimator which is configured to select a second portion of a different video image of the motion video signal wherein the second portion is temporally displaced from the first-mentioned portion and which is further configured to produce an error signal which represents differences between the first portion and the second portion;
   a comparator which is operatively coupled to the motion estimator and which is configured to compare the error signal to a predetermined threshold;
   a temporal filter module which is operatively coupled to the comparator and which is configured to apply a temporal filter to the first and second portions to produce a filtered portion if the error signal is less than the predetermined threshold; and
   a transforming module which is operatively coupled to the temporal filter module and which is configured to transform the filtered portion using transformation coefficients;
   a quantizing module which is operatively coupled to the transforming module and which is configured to quantize the transformation coefficients using a quantization parameter; and
   a quantization parameter adjustment module which is operatively coupled to the quantizing module and which is configured to adjust the quantization parameter for the filtered portion if the error signal is less than the predetermined threshold.

23. The system of claim 22 wherein the quantization parameter adjustment module is further configured to reduce the quantization parameter by a predetermined margin.

24. The system of claim 23 wherein the quantization parameter adjustment module is further configured to select the predetermined margin from a number of predetermined margins according to the quantization parameter.

* * * * *